United States Patent

Boon

[15] 3,663,748

[45] May 16, 1972

[54] FACSIMILE SYSTEM UTILIZING SINGLE CRT FOR SCANNING AND IMAGE REPRODUCTION

[72] Inventor: Joseph L. Boon, Rochester, N.Y.

[73] Assignee: Eastman Kodak Company, Rochester, N.Y.

[22] Filed: Aug. 6, 1969

[21] Appl. No.: 847,975

[52] U.S. Cl. .......................................178/6.6 A, 346/74 CR

[51] Int. Cl. ......................H04n 1/12, H04n 1/30, H04n 1/24

[58] Field of Search ...............178/6.6 R, 6.6 A, 6.7 R, 6.7 A, 178/6.6 B; 346/74 CR, 74 ES; 313/72, 73; 315/13, 19 PR

[56] References Cited

UNITED STATES PATENTS

| | | | |
|---|---|---|---|
| 2,657,377 | 10/1953 | Gray | 178/6.6 A |
| 3,110,764 | 11/1963 | Barry | 178/6.6 A |
| 3,375,527 | 3/1968 | Zirbel | 178/6.6 A |
| 3,394,221 | 7/1968 | Townsend | 178/6.6 A |

*Primary Examiner*—Bernard Konick
*Assistant Examiner*—Steven B. Pokotilow
*Attorney*—R. W. Hampton and Daniel E. Sragow

[57] ABSTRACT

An electrostatic facsimile system utilized a single cathode ray tube in performing both scanning and image reproduction operations. In one embodiment, one gun of a twin gun tube is used to produce a flying spot for scanning a document to be reproduced. The light reflected by the document is collected by a photomultiplier tube which produces an electrical image signal which is fed, through suitable monitoring means, to the second gun of the cathode ray tube. The external ends of the wire array terminate on the surface of a suitable receiving medium, where an electrostatic image is produced. Such image is then developed and fixed to produce a facsimile of the original. In a second embodiment one electron gun of a cathode ray tube is used for both scanning and image reproduction operations by providing means for switching the beam produced by the signal gun so that it alternately produces a flying spot on the document and produces an electrostatic image on the wire array.

3 Claims, 3 Drawing Figures

FIG. I

JOSEPH L. BOON
INVENTOR.
BY Daniel E. Sragow
Robert W. Hampton
ATTORNEYS

Patented May 16, 1972 3,663,748

2 Sheets-Sheet 2

JOSEPH L. BOON
INVENTOR.

BY Daniel E. [signature]

Robert W. Hampton
ATTORNEYS

FACSIMILE SYSTEM UTILIZING SINGLE CRT FOR SCANNING AND IMAGE REPRODUCTION

BACKGROUND OF THE INVENTION

1. Field of the Invention

The present invention relates to electrostatic printing and more particularly to electrostatic printing systems wherein a light beam produced by a cathode ray tube is used to scan a document to be reproduced and the reflected light from the document is translated into electrical image signals used to produce a facsimile of the document.

2. Description of the Prior Art

There are many approaches in the prior art to the problem of facsimile reproduction of documents. In a number of approaches the original is translated into an electrical signal and the electrical signal is converted into a facsimile of the original. One specific approach involves the use of a light beam from a first cathode ray tube to scan the document to be reproduced, collection of the reflected light from the document with a photomultiplier tube and transmission of the resultant electrical signal from the photomultiplier tube to a second cathode ray tube which produces an output beam in accordance therewith. The output beam of the second cathode is translated into a facsimile reproduction of the original. Such a system is obviously quite involved and the space requirements therefor are high.

SUMMARY OF THE INVENTION

In accordance with the present invention an improved printing system is provided wherein a single cathode ray tube is used both in scanning of an original document and in translating a feedback signal in accordance with the light reflected from that document into a reproduction of the document.

In accordance with one embodiment of the invention, one gun of a twin gun cathode ray tube type is used for scanning the original and a second gun is used in reproducing a facsimile of the original. The other gun produces a beam which is modulated in accordance with an electrical image output signal produced by a photomultiplier tube which in turn senses the light reflected by the original document from the scan. This modulated beam impinges on a wire array which passes through the face of the tube to a suitable receiving medium to produce an electrostatic image.

In accordance with a second embodiment of the invention, the beam from a single gun cathode ray tube is switched between a document scanning area on the cathode ray tube faceplate and an image reproduction area. Suitable circuitry causes the beam to scan the document and the wire array during alternate horizontal sweeps and modulates the beam according to the image signal which was received during the scanning of the document.

In addition to requiring only a single cathode ray tube, a system in accordance with the invention requires only a single horizontal deflection circuit for sweeping both the scanning beam and the modulated beam.

BRIEF DESCRIPTION OF THE DRAWINGS

Other features and advantages of the present invention will be apparent upon consideration of the following detailed description taken in connection with the accompanying drawing wherein.

DESCRIPTION OF THE PREFERRED EMBODIMENTS

Figure 1:
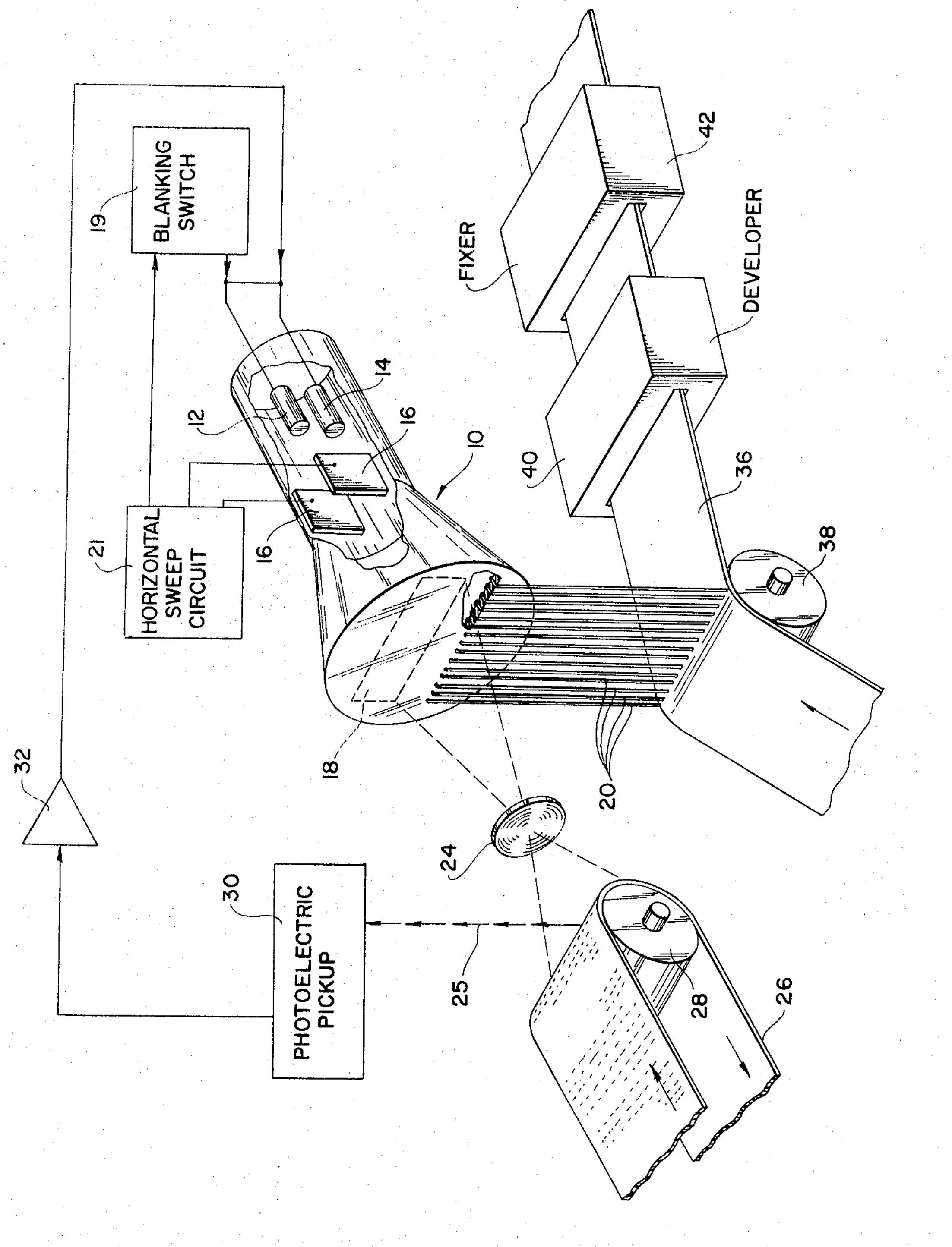
FIG. 1 is a schematic representation of a first embodiment of the invention.

Referring to FIG. 1 of the drawing, a cathode ray tube which is represented schematically and generally identified by the reference numeral 10 is used in both document scanning and in image reproduction. The cathode ray tube 10 is of the twin gun type and includes a first electron gun 12 located in a first horizontal plane, a second electron gun 14 located below gun 12 as shown in a second horizontal plane, horizontal deflection means shown here as a pair of electrostatic deflection plates 16, a phosphor coating 18 on the face of the tube 10 and a wire array generally indicated by reference numeral 20 which extends through the face of the tube. Other conventional structure associated with cathode ray tube 10 has been omitted for purposes of simplicity.

The electron gun 12 is adapted to produce an electron beam which impinges on the phosphor coating 18 in a conventional manner. A blanking switch 19 is coupled to the electron gun to turn the electron beam on and off. The beam produced by electron gun 12 is swept across the face of tube 10 under the influence of the horizontal deflection elements 16 which are coupled to a horizontal sweep circuit 21. As the beam strikes the phosphor coating 18, a corresponding luminous spot is produced which sweeps across the face of the tube. The luminous spot so emitted is focused by a lens 24 which images the spot onto an original document 26 to be reproduced. Document 26 may be moved through a predetermined path at a fixed speed by a conveyor system including a rotating drum 28.

When the spot scans document 26, a portion of the light is reflected from the white or light colored areas of the document along a path 25 to a light sensitive means 30 comprising a photomultiplier or other phototube. When the scanning light beam falls on relatively dark areas of the document 26 there is less reflection than from the bright parts of the area. In a manner well known in the art, phototube 30 translates the reflected light from document 26 into an output or electrical image signal corresponding to the pattern of light and dark areas on the document.

The output of phototube 30 is coupled through amplifier 32 to the control grid (not shown) of the second electron gun 14 of cathode ray tube 10. The output of amplifier 32 effectively causes electron gun 14 to produce a modulated electron beam which is swept across the face of the cathode ray tube by horizontal deflection elements 16 simultaneously with the unmodulated beam produced by electron gun 12 but in a different plane so that the beam produced by electron gun 14 impinges on the wire array 20 which extends into the tube 10. Wire array 20 may comprise wire conductors arranged on the inside of the tube in a manner well known in the art and may be used to create an image laterally across the face of a record medium comprising for example an electrostatic paper 36. As shown in the drawing wires 20 are positioned so as to be in the path of the electron beam emitted by electron gun 14 but below the path of the beam emitted by electron gun 12. One end of wire array 20 is positioned adjacent that portion of the receiving paper 36 which is positioned to receive the electrostatic charge.

The electrostatic paper 36 may be moved along a predetermined path at a fixed speed by a conveyor system represented by a rotating drum 38. To produce a one-to-one correspondence between the original and the reproduced image thereof, the electrostatic paper 36 is preferably moved at the same fixed rate as the original. The electrostatic paper 36 may be of a type well known in the art capable of retaining a charge corresponding to the output of the wire array 20. The paper 36 after receiving such charge from array 20 may be passed to a developing station 40 wherein it may be processed such as by applying a developer powder to the electrostatic paper so that the powder adheres to the charged areas thereof.

The electrostatic paper 36 may be passed from the developing status 40 to a fixing station 42 wherein the image is fixed to the paper by any suitable known fixing technique. The developing system may be, of course, a continuous system and while one image is being developed or fixed, another image may be in the process of being electrostatically recorded on the receiving paper 36. The particular system shown for charging, developing and fixing is shown merely for purposes of illustration and alternative techniques may be employed. For example, a film may be substituted for the electrostatic paper 36 or the paper 36 may be replaced with an offset plate for graphic arts operations.

Figures 2, 3:
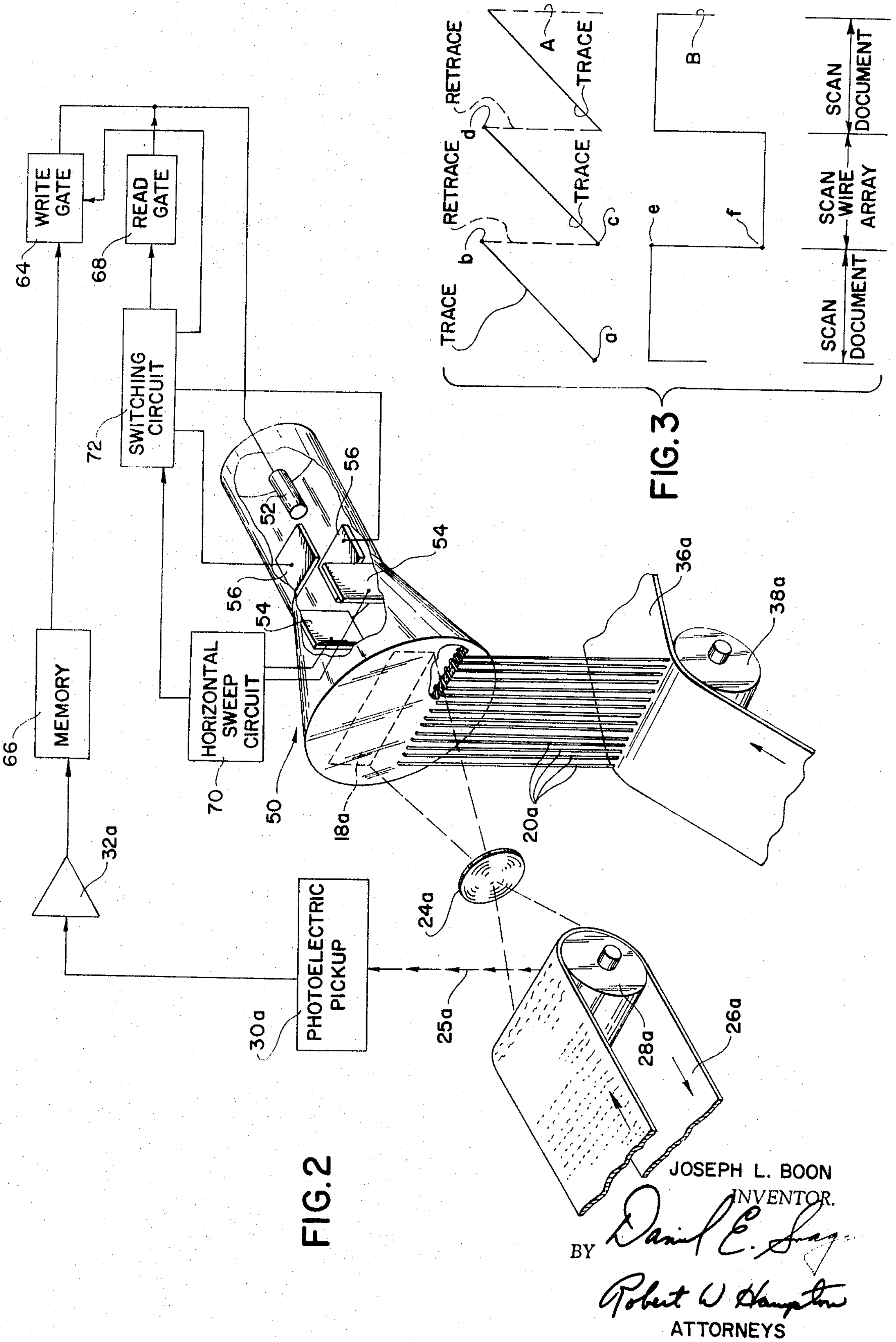
FIG. 2 is a schematic representation of a second embodiment of the invention.
FIG. 3 is a pair of curves showing the horizontal and vertical deflection signals as used in the embodiment of FIG. 2.

Referring to FIG. 2 of the drawing, there is shown a second embodiment of the present invention wherein a cathode ray tube having a single electron gun is utilized instead of the pair of electron guns depicted in FIG. 1. For convenience, the parts in FIG. 2 which correspond to those in FIG. 1 are identified by like reference number with a suffix *a*.

Referring specifically to FIG. 2 there is shown a cathode ray tube 50 having an electron gun 52, and both horizontal and vertical deflection means. The horizontal deflection means comprises deflection elements 54 and the vertical deflection means comprises deflection elements 56. A phosphor coating 18*a* is provided on the face of the tube 50 and a wire array 20*a* extends through the face of tube 50. Thus the tube 50 is similar to the tube 10 illustrated in FIG. 1 but differs in that it has only a single electron gun and additionally is provided with vertical deflection elements, the purpose of which will be described hereinafter.

In the embodiment shown in FIG. 2 the gun 52 produces an electron beam which is swept laterally across the face of tube 50 in vertically spaced horizontal paths as viewed in FIG. 2 under the influence of the horizontal deflection elements 54 and the vertical deflection elements 56. In general during one half cycle of operation the beam will sweep laterally across the phosphor coating 18*a* to scan one line of document 26*a*. During the next half-cycle the beam will sweep laterally across the face plate of tube 50 so as to impinge on wire array 20*a* and thereby create a charge image line laterally across the face of paper 36*a*. This cycle will be continuously repeated with the system functioning to alternately produce image scanning and image reproduction. During the scanning half-cycle the beam will have a constant intensity whereas during the image reproduction half-cycle the intensity will vary in intensity according to the image to be reproduced on the record medium 36*a*.

Referring now to the specific means for accomplishing the described cycle of operation, the output signal of phototube 30*a* is amplified by amplifier 32*a* as functionally illustrated in block diagram in FIG. 2. The output of amplifier 32*a* is stored in memory 66. The information stored in memory 66 is selectively coupled to the electron gun 52 by "write" gate 64. As will later be described, "write" gate 64 is rendered conductive during that portion of the scanning cycle in which the cathode ray beam moves across the ends of wire array 20*a* of the tube 50. Memory 66 has a storage time period approximately equal to one scanning cycle, after which the memory is automatically erased.

As will later be described in more detail "read" gate 68 is rendered conductive during that portion of the scanning cycle in which the beam is scanned across phosphor coating 18*a* to scan the document 26, to supply a signal of constant magnitude to the gun 52.

Referring to the circuitry for the horizontal deflection elements 54, a horizontal sweep circuit 70 is effective to generate and apply a saw tooth signal having the wave form A of FIG. 3 to the horizontal deflection elements 54 continuously during operation of the system. The application of this saw tooth signal to the deflection elements 54 causes the beam to sweep cross the face of the tube 50 in a horizontal line during those portions of the wave form shown in solid lines with retrace occuring during those portion of the wave form shown in dashed lines. Such horizontal sweep circuits and horizontal scanning are well known in the art, and further description is deemed unnecessary.

Referring to the circuitry for the vertical deflection elements 56, a switching circuit 72 is arranged to apply a pulse signal having the rectangular wave form B shown in FIG. 3 to the vertical deflection elements 56 to effect vertical displacement of the beam between phosphor coating 18*a* and wire array 20. Specifically, during the first half-cycle of the wave form B the deflection elements 56 will be biased to position the beam on the phosphor coating 18*a* so as to scan document 26*a*. During the second half-cycle of wave form B the deflection elements 56 will be biased to cause the beam to sweep wire array 20. As indicated in FIG. 3 the pulse signal generated by switching circuit 62 is synchronized with the saw tooth signal generated by the horizontal sweep circuit 70 by sync pulses which occur during retrace. Thus, in operation the beam will first scan phosphor coating 18*a* and then will be deflected to wire array 20*a* during the retrace whereupon it will again be horizontally deflected, but this time across the ends of wire array 20*a*.

Considering now the operation of the system depicted in FIG. 2 during one complete cycle, during the first positive half-cycle of the pulse signal B the vertical deflection elements 56 will be biased to position the beam to sweep phosphor coating 18 to produce a flying spot scan. Gate 68 will be biased to a conductive state to apply a bias voltage to gun 52 so as to generate a beam. Accordingly, as the sweep signal varies from point (a) to point (b) (FIG. 3) one line of the document 26 will be scanned. As the line is scanned the light reflected by the document 26*a* will be translated by phototube 30*a* into a signal which is amplified by amplifier 32*a* to produce an output signal which is stored in memory 66. Between points (b) and (c) of the saw tooth wave form, retrace will occur and at point (b) the first half-cycle of pulse signal B will end in response to the sync pulse generated by horizontal sweep circuit 70 whereupon the beam will retrace, switching circuit 72 will change its state, thus causing gate 64 to open, and gate 68 to close. Deflection elements 56 will then position the beam to sweep wire array 20.

As the saw tooth signal subsequently varies between points (c) and (d) of FIG. 3, the beam will trace a line over wire array 20*a*. However, during this sweep the electron beam will be modulated by the image signal output of memory 66 and an image line will thus be reproduced on record medium 36*a* corresponding to the line of document 26*a* scanned during the previous half-cycle. When the saw tooth signal reaches point (d) of FIG. 3, retrace will again occur accompanied by change in state of switching circuit 72, opening of gate 64 and closing of gate 68 so as to again scan phosphor coating 18*a*. Thus the cycle will be repeated to effect alternate line scanning and image reproduction. It is to be noted that gates 64 and 68 have been described as closed when they are in a state to pass a signal.

It will be appreciated that the use of a single cathode ray tube both for scanning of the original and for creating an electrostatic image copy material produces a very compact copier. Through the use of mirrors, rollers and the like the entire system can be made very compact; it should be noted that other orientations of the elements of the particular system illustrated could be used to produce a more compact overall system.

It is noted that it is possible through the use of reductions in either the optical relay system 24*a* or in the sweep to provide magnifications other than one-to-one and to reproduce copy less than standard in width.

The invention has been described in detail with particular reference to preferred embodiments thereof, but it will be understood that variations and modifications can be effected within the spirit and scope of the invention.

I claim:

1. An electrostatic printing apparatus for reproducing a facsimile of an original document, said apparatus comprising:
- a cathode ray tube including a faceplate having a surface and first and second electron gun means each for producing an electron beam;
- a luminescent phosphor coating located on the surface of said faceplate at a position for impingement by the beam from said first electron gun means, said phosphor coating having the property of luminescing in response to electron bombardment, said original document being positionable for illumination by said phosphor;

wire means passing through said faceplate and being positioned for impingement by the beam of said second electron gun means;

means for sensing light from the original document and for producing an electrical image signal in accordance therewith; and means for modulating the electron beam produced by said second electron gun in response to the signal produced by said electrical image signal producing means, to produce an electrostatic charge on said wire means in accordance with said modulated beam.

2. A facsimile apparatus for sensing visual information and reproducing such information, said apparatus comprising:

a cathode ray tube having electron beam producing means and a faceplate, said faceplate having first and second regions, said first region having a coating of luminescent phosphor thereon so that impingement thereon of an electron beam will produce a luminous spot for illuminating said visual information, said second region having a plurality of conductors extending through said faceplate;

deflecting means for sweeping an electron beam from said beam producing means over said first region and said second region;

photoelectric pickup means disposed to sense light from visual information for producing an output in accordance therewith;

means for controlling the intensity of the beam impinging upon said second region in accordance with the output of said photoelectric pickup means; and means for producing an image in accordance with the radiation received by said second region from said beam producing means.

3. Apparatus for scanning information and for reproducing information on a recording medium, comprising:

a cathode ray tube having a face surface and electron beam generating means;

a coating on said face surface for establishing a spot of light on said face surface when electrically activated by an electron beam;

means for focusing said spot of light on information to be reproduced;

electrostatic image means within said tube for establishing an electrostatic charge when electrically activated by an electron beam;

means for displacing an electron beam generated by said beam generating means to scan a portion of said face surface to establish light spot scanning of the information;

means responsive to light from the information during such scanning for establishing an electrical image signal;

means responsive to said image signal for modulating an electron beam generated by said beam generating means during scanning of said electrostatic image means by said beam generating means to establish an electrostatic image corresponding to the scanned information; and means for converting said electrostatic image to a visible image on the recording medium.

* * * * *